(12) United States Patent
Botez et al.

(10) Patent No.: US 9,587,709 B2
(45) Date of Patent: Mar. 7, 2017

(54) LINK FOR INVERTED TOOTH CHAIN WITH OPTIMIZED SHAPE FOR INCREASED STRENGTH

(71) Applicants: Schaeffler Technologies AG & Co. KG, Herzogenaurach (DE); Schaeffler Group USA, Inc., Fort Mill, SC (US)

(72) Inventors: Lucian Botez, Novi, MI (US); Vineeth Jampala, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/871,214

(22) Filed: Sep. 30, 2015

(65) Prior Publication Data

US 2016/0097437 A1    Apr. 7, 2016

Related U.S. Application Data

(60) Provisional application No. 62/060,836, filed on Oct. 7, 2014.

(51) Int. Cl.
*F16G 13/04* (2006.01)
*F16H 7/06* (2006.01)
*F16G 13/08* (2006.01)

(52) U.S. Cl.
CPC ............. *F16G 13/04* (2013.01); *F16G 13/08* (2013.01)

(58) Field of Classification Search
CPC .................................. F16G 13/04; F16H 7/06
USPC .................................................. 474/212, 213
See application file for complete search history.

(56) References Cited

U.S. PATENT DOCUMENTS

| | | | | |
|---|---|---|---|---|
| 4,759,740 A * | 7/1988 | Cradduck | ............... | F16G 13/04 474/212 |
| 5,803,854 A * | 9/1998 | Tada | ....................... | F16G 13/04 474/206 |
| 6,155,944 A | 12/2000 | Matsuda | | |
| 7,850,565 B2 * | 12/2010 | Junig | ..................... | F16G 13/04 474/215 |
| 8,641,566 B2 * | 2/2014 | Ispolatova | ............. | F16G 13/04 474/157 |
| 2001/0023212 A1 | 9/2001 | Horie et al. | | |
| 2007/0105676 A1 * | 5/2007 | Vietoris | ................. | F16G 13/04 474/215 |

(Continued)

FOREIGN PATENT DOCUMENTS

KR    10-2008-0015396 A    2/2008

*Primary Examiner* — William E Dondero
*Assistant Examiner* — Mark K Buse
(74) *Attorney, Agent, or Firm* — Volpe and Koenig, P.C.

(57) ABSTRACT

An inverted tooth chain assembly configured to mesh with a sprocket is provided including a link with an improved shape for increased strength. The link includes two teeth, a pair of outer flanks, first and second inner flanks, and a crotch located between the first and second inner flanks. A first transition point is arranged between the first inner flank and a first end region of the crotch, and a second transition point is arranged between the second inner flank and a second end region of the crotch. A crotch surface is defined between the first transition point and the second transition point and has a profile with a varying radius of curvature. The profile of the crotch surface has a smaller radius of curvature at the first and second end regions and a larger radius of curvature at a medial region between the first and second end regions.

8 Claims, 4 Drawing Sheets

(56) References Cited

U.S. PATENT DOCUMENTS

| | | | |
|---|---|---|---|
| 2007/0155564 A1* | 7/2007 | Ledvina | F16G 13/04 |
| | | | 474/215 |
| 2007/0191164 A1* | 8/2007 | Ispolatova | F16G 13/04 |
| | | | 474/212 |
| 2010/0016110 A1 | 1/2010 | Yoshida | |
| 2012/0165144 A1* | 6/2012 | Dogimont | F16G 13/04 |
| | | | 474/212 |
| 2015/0308541 A1* | 10/2015 | Botez | F16H 7/06 |
| | | | 474/157 |

* cited by examiner

LINK FOR INVERTED TOOTH CHAIN WITH OPTIMIZED SHAPE FOR INCREASED STRENGTH

INCORPORATION BY REFERENCE

The following documents are incorporated herein by reference as if fully set forth: U.S. Provisional Patent Application No. 62/060,836 filed Oct. 7, 2014.

FIELD OF INVENTION

The present invention generally relates to an inverted tooth chain, and more specifically relates to an improved link profile.

BACKGROUND

Known chain sprocket and sprocket drive systems include a sprocket and an inverted tooth chain assembly including at least two links. One known link is shown in FIG. 1, which shows a link according to the prior art. These known links 108 typically include two teeth 110, 112, inner flanks 118, 120, and a crotch 122. As shown in FIG. 1, the crotch surface 132 of the crotch 122 has a constant radius profile between the inner flanks 118, 120. For any given link, the center point of the crotch surface is the critical design area for supporting loads. Any given link has a high stress concentration and its lowest fatigue safety factor at this center point. Known solutions for increasing the strength of the link at this center point include either increasing the crotch depth or increasing the width of the links. Both of these solutions increase the material required to form a link and increase the mass of the link, which is undesirable. It would be desirable to provide a link that both increases the safety fatigue factor for the link, particularly at a center point of the crotch, and generally does not increase the amount of material required to form the link.

SUMMARY

A chain and sprocket drive system is provided including an inverted tooth chain assembly with links having a crotch with an optimized profile for increased strength. The chain and sprocket drive system includes a sprocket and the inverted tooth chain assembly configured to mesh with the sprocket. The inverted tooth chain assembly includes at least two rows of the links. Each of the links include two teeth, a pair of outer flanks, first and second inner flanks, and a crotch located between the first and second inner flanks. A first transition point is arranged between the first inner flank and a first end region of the crotch, and a second transition point is arranged between the second inner flank and a second end region of the crotch. A crotch surface is defined between the first transition point and the second transition point, and the crotch surface has a profile with a varying radius of curvature. The profile of the crotch surface has a smaller radius of curvature at the first and second end regions and a larger radius of curvature at a medial region between the first and second end regions.

In one embodiment, the profile of the crotch surface is continuously variable between the first and second transition points. In another embodiment, the profile of the crotch surface has a plurality of crotch regions, and each of the plurality of crotch regions has a different radius of curvature.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
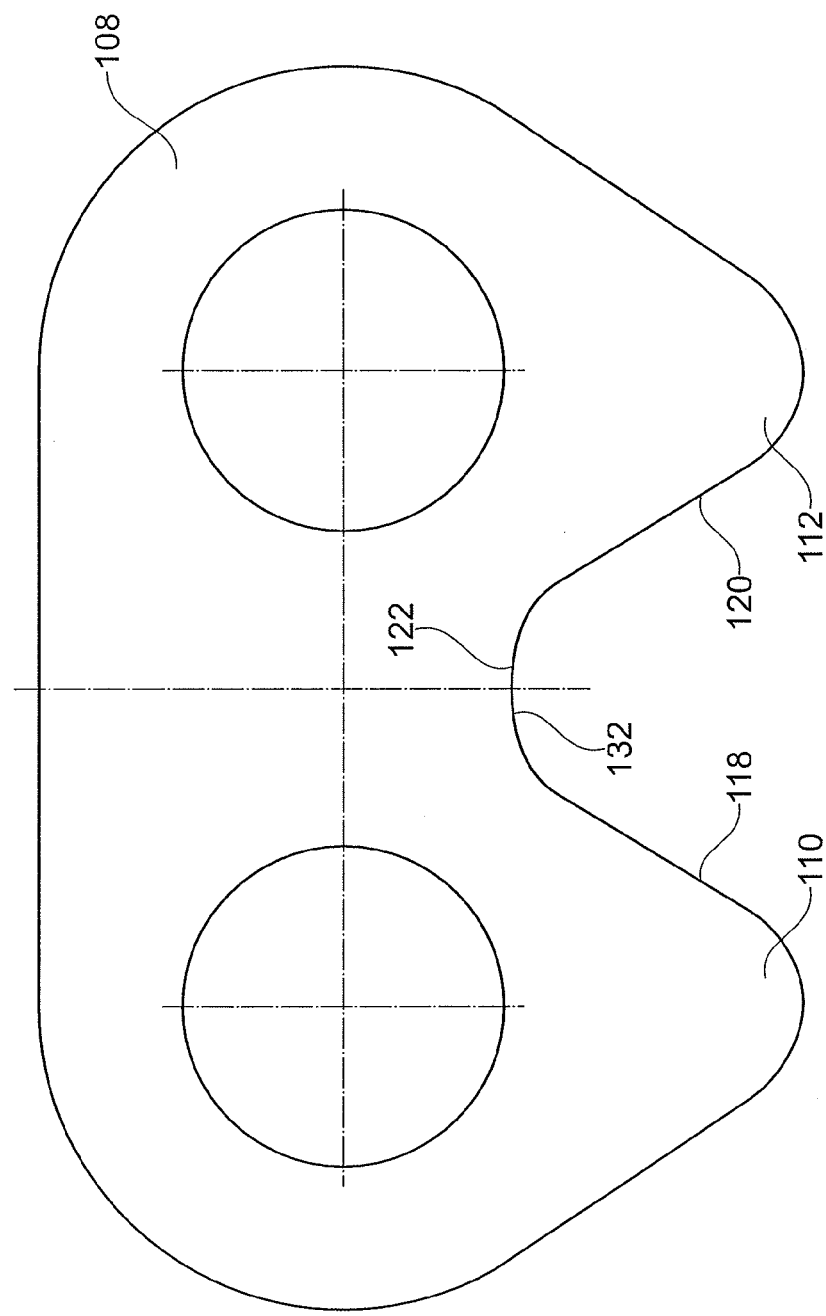
FIG. 1 shows a front view of a link according to the prior art.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
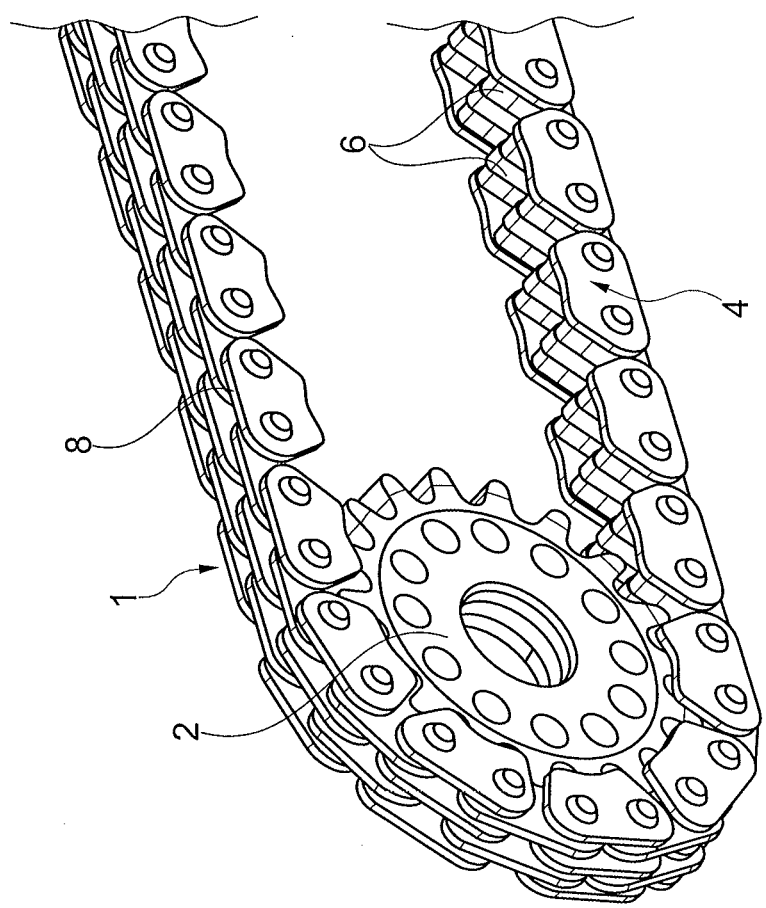
FIG. 2 shows a partial perspective view of a chain and sprocket drive system.
Figure 3:
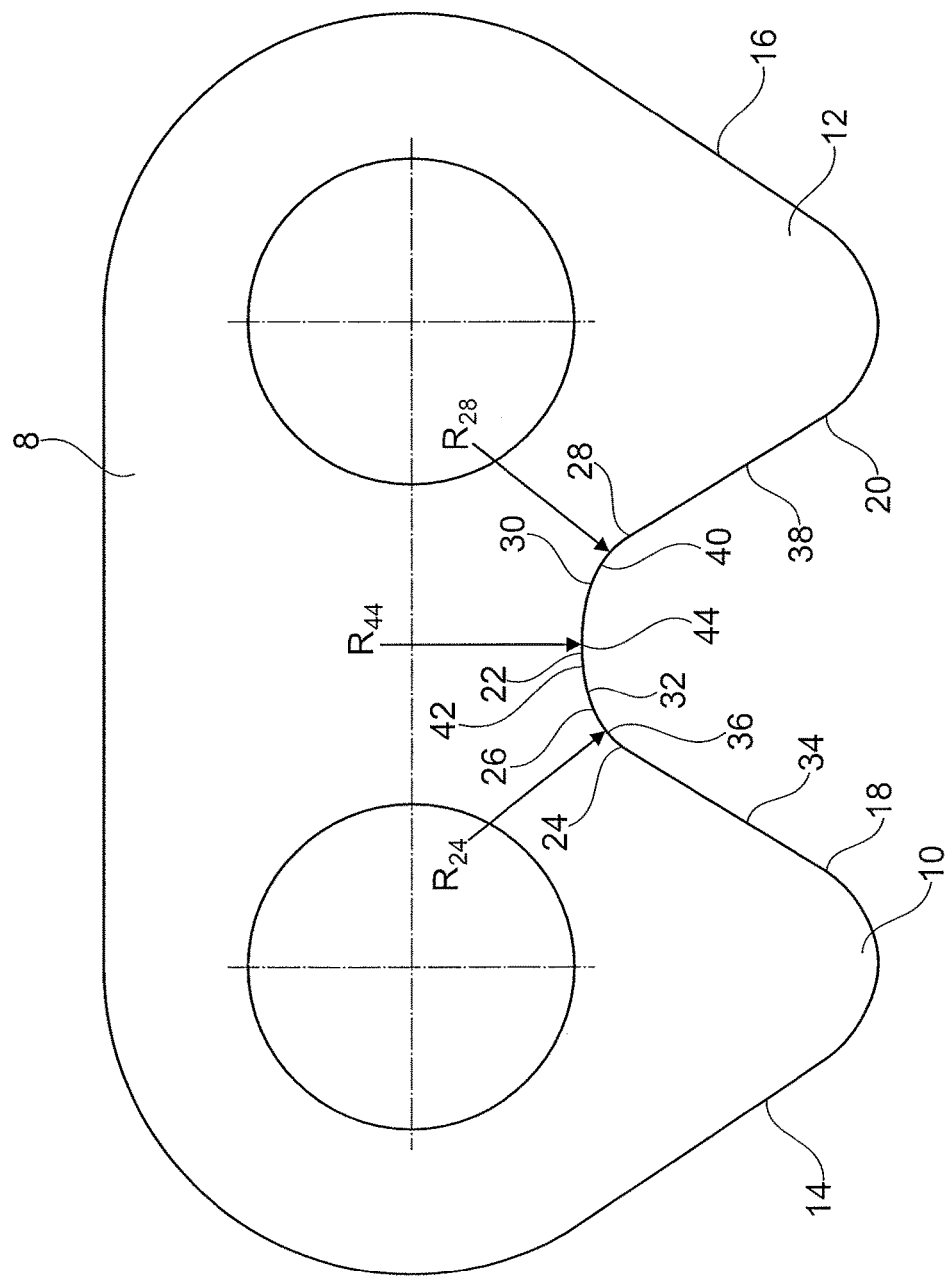
FIG. 3 shows a front view of a link according to the invention.
Figure 4:
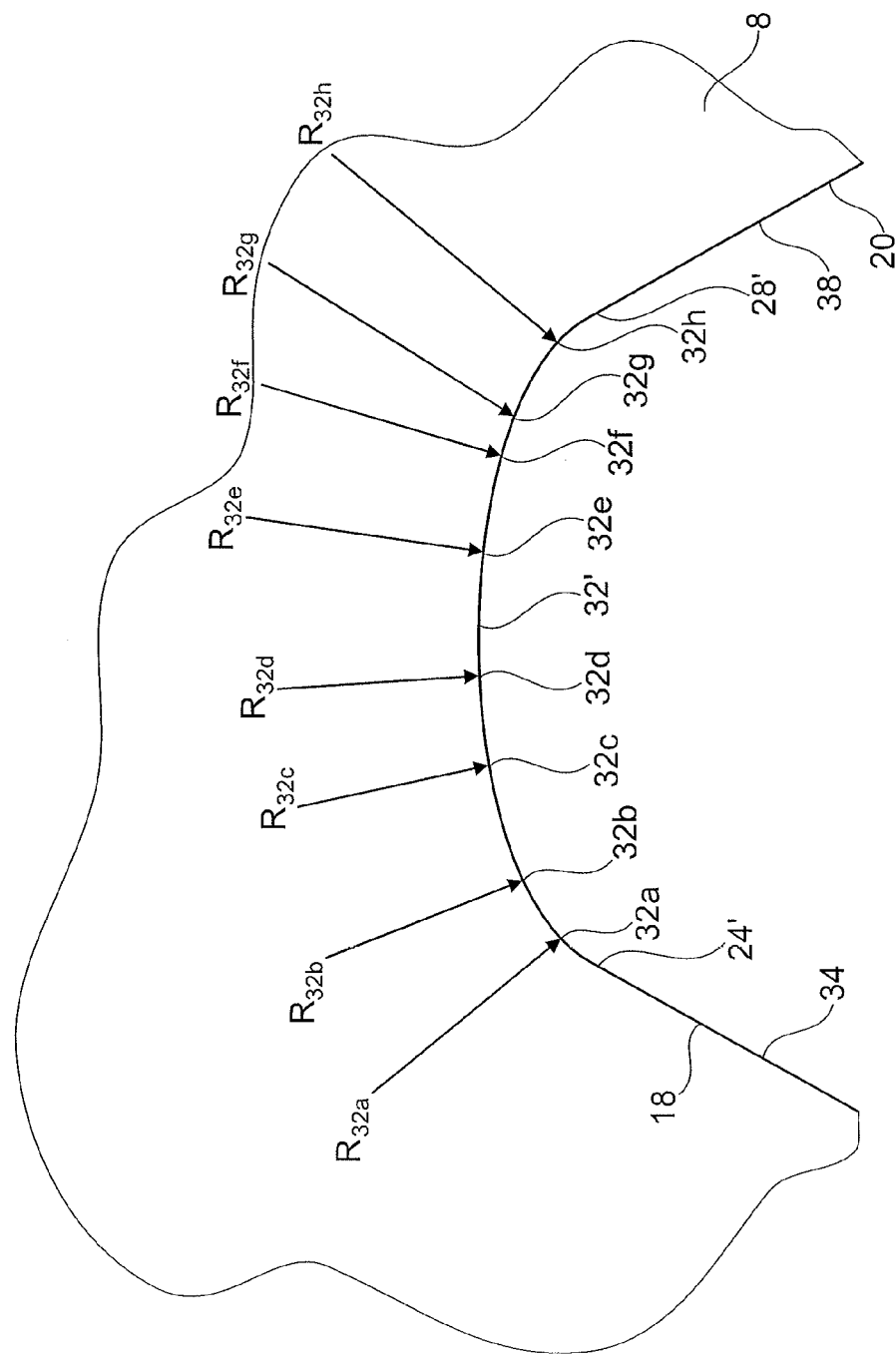
FIG. 4 shows a partial front view of a crotch of a link according to another embodiment of the invention.

As shown in FIG. 2, a chain and sprocket drive system 1 is provided. The chain and sprocket drive system 1 includes a sprocket 2 and an inverted tooth chain assembly 4 configured to mesh with the sprocket 2. The inverted tooth chain assembly 4 includes at least two rows 6 of links 8. As shown in FIG. 3, each of the links 8 include two teeth 10, 12, a pair of outer flanks 14, 16, first and second inner flanks 18, 20, and a crotch 22 located between the first and second inner flanks 18, 20. A first transition point 24 is arranged between the first inner flank 18 and a first end region 26 of the crotch 22, and a second transition point 28 is arranged between the second inner flank 20 and a second end region 30 of the crotch 22. A crotch surface 32 is defined between the first transition point 24 and the second transition point 28 and has a profile with a varying radius of curvature. The profile of the crotch surface 32 has a smaller radius of curvature $R_{24}$, $R_{28}$ at the first and second end regions 26, 30 leading to the first transition point 24 and second transition point 28, and a larger radius of curvature $R_{44}$ at a medial region 44 between the first and second transition points 24, 28. In one embodiment, the profile of the crotch surface 32 is continuously variable between the first and second transition points 24, 28. As shown in FIG. 3, a first inner flank surface 34 is flat, and the first inner flank surface 34 and a first crotch region surface 36 are tangent to each other at the first transition point 24. Similar to the first inner flank surface 34, a second inner flank surface 38 is also flat, and the second inner flank surface 38 and a second crotch region surface 40 are tangent to each other at the second transition point 28. In the embodiment shown in FIG. 3, the crotch surface 32 has a partial elliptical profile. This configuration results in a larger local radius of curvature at a center point of the crotch 22 in the medial region 44, which reduces the stress concentration, increases the chain strength, and provides an increased ability to support a load. As shown in FIG. 3, the crotch surface 32 has a center point 42 defined between the first end region 26 and the second end region 30, and the first end region 26 and the second end region 30 have profiles that are mirror-symmetrical to each other. In another embodiment shown in FIG. 4, the profile of the crotch surface 32' has a plurality of crotch regions 32a-32h, and each of the plurality of crotch regions 32a-32h has a different radius of curvature $R_{32a\text{-}32h}$. In the embodiment shown in FIG. 4, the profile of the crotch surface 32' has eight crotch regions 32a-32h. One of ordinary skill in the art recognizes the number of crotch regions can be varied or can be continuously variable to optimize the strength of the crotch 22.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A chain and sprocket drive system comprising:
   a sprocket; and
   an inverted tooth chain assembly configured to mesh with the sprocket, the inverted tooth chain assembly including at least two rows of links,
   each of the links having two teeth, a pair of outer flanks, first and second inner flanks, a crotch located between the first and second inner flanks, a first transition point arranged between the first inner flank and a first end region of the crotch, and a second transition point arranged between the second inner flank and a second end region of the crotch, wherein a crotch surface defined between the first transition point and the second transition point has a profile with a varying radius of curvature, the profile of the crotch surface has a smaller radius of curvature at the first and second end regions and a larger radius of curvature at a medial region between the first and second end regions, wherein a first inner flank surface is flat, and the first inner flank surface and a first crotch region surface are tangent to each other at the first transition point.

2. The chain and sprocket drive system of claim 1, wherein the profile of the crotch surface is continuously variable between the first and second transition points.

3. The chain and sprocket drive system of claim 1, wherein a second inner flank surface is flat, and the second inner flank surface and a second crotch region surface are tangent to each other at the second transition point.

4. The chain and sprocket drive system of claim 1, wherein the crotch surface has a partial elliptical profile.

5. The chain and sprocket drive system of claim 1, wherein the crotch surface has a center point defined between the first end region and the second end region, and the first end region and the second end region have profiles that are mirror-symmetrical to each other.

6. The chain and sprocket drive system of claim 1, wherein the profile of the crotch surface has a plurality of crotch regions, and each of the plurality of crotch regions has a different radius of curvature.

7. The chain and sprocket drive system of claim 1, wherein the profile of the crotch surface has eight crotch regions.

8. An inverted tooth chain assembly configured to mesh with a sprocket, the inverted tooth chain assembly comprising:
   at least two rows of links, each of the links having two teeth, a pair of outer flanks, first and second inner flanks, a crotch located between the first and second inner flanks, a first transition point arranged between the first inner flank and a first end region of the crotch, and a second transition point arranged between the second inner flank and a second end region of the crotch, wherein a crotch surface defined between the first transition point and the second transition point has a profile with a varying radius of curvature, the profile of the crotch surface has a smaller radius of curvature at the first and second end regions and a larger radius of curvature at a medial region between the first and second end regions, wherein a first inner flank surface is flat, and the first inner flank surface and a first crotch region surface are tangent to each other at the first transition point.

\* \* \* \* \*